United States Patent
Asbag et al.

(10) Patent No.: US 11,037,286 B2
(45) Date of Patent: Jun. 15, 2021

(54) METHOD OF CLASSIFYING DEFECTS IN A SEMICONDUCTOR SPECIMEN AND SYSTEM THEREOF

(71) Applicant: Applied Materials Israel Ltd., Rehovot (IL)

(72) Inventors: Assaf Asbag, Alfei Menashe (IL); Ohad Shaubi, Yavne (IL); Kirill Savchenko, Lod (IL); Shiran Gan-Or, Ganei Tiqwa (IL); Boaz Cohen, Lehavim (IL); Zeev Zohar, Migdal (IL)

(73) Assignee: Applied Materials Israel Ltd., Rehovot (IL)

( * ) Notice: Subject to any disclaimer, the term of this patent is extended or adjusted under 35 U.S.C. 154(b) by 197 days.

(21) Appl. No.: 15/719,447

(22) Filed: Sep. 28, 2017

(65) Prior Publication Data
US 2019/0096053 A1 Mar. 28, 2019

(51) Int. Cl.
| | |
|---|---|
| *G06K 9/00* | (2006.01) |
| *G06T 7/00* | (2017.01) |
| *G06K 9/62* | (2006.01) |
| *G06K 9/03* | (2006.01) |

(52) U.S. Cl.
CPC ........ *G06T 7/0004* (2013.01); *G06K 9/00127* (2013.01); *G06K 9/036* (2013.01); *G06K 9/6256* (2013.01); *G06K 9/6269* (2013.01); *G06K 9/6281* (2013.01); *G06T 2207/30148* (2013.01)

(58) Field of Classification Search
CPC ........ G06T 7/0004; G06T 2207/30148; G06K 9/6281; G06K 9/036; G06K 9/6256
See application file for complete search history.

(56) References Cited

U.S. PATENT DOCUMENTS

| | | | |
|---|---|---|---|
| 7,162,073 B1 * | 1/2007 | Akgul | G01N 21/8851 348/125 |
| 8,165,384 B1 * | 4/2012 | Ma | G03F 1/70 382/149 |
| 8,315,453 B2 | 11/2012 | Shlain et al. | |
| 9,607,233 B2 | 3/2017 | Kaizerman et al. | |
| 9,715,723 B2 | 7/2017 | Shlain et al. | |
| 2006/0291714 A1 * | 12/2006 | Wu | G01N 21/95607 382/149 |
| 2007/0288219 A1 * | 12/2007 | Zafar | G06T 7/0008 703/14 |
| 2008/0075352 A1 * | 3/2008 | Shibuya | G06K 9/6254 382/141 |
| 2010/0131450 A1 * | 5/2010 | Nguyen | G06N 5/022 706/54 |
| 2012/0140060 A1 * | 6/2012 | Tsuchiya | G01N 21/95607 348/126 |

(Continued)

*Primary Examiner* — Solomon G Bezuayehu
(74) *Attorney, Agent, or Firm* — Lowenstein Sandler LLP

(57) ABSTRACT

There are provided a classifier and a method of classifying defects in a semiconductor specimen. The classifier enables assigning each class to a classification group among three or more classification groups with different priorities. Classifier further enables setting purity, accuracy and/or extraction requirements separately for each class, and optimizing the classification results in accordance with per-class requirements. During training, the classifier is configured to generate a classification rule enabling the highest possible contribution of automated classification while meeting per-class quality requirements defined for each class.

20 Claims, 10 Drawing Sheets

(56) References Cited

U.S. PATENT DOCUMENTS

| | | | |
|---|---|---|---|
| 2015/0254832 A1* | 9/2015 | Plihal | G06N 20/00 |
| | | | 382/149 |
| 2016/0189055 A1* | 6/2016 | Zvitia | G06N 20/00 |
| | | | 706/11 |
| 2016/0328837 A1* | 11/2016 | He | G06K 9/6256 |
| 2016/0358041 A1* | 12/2016 | Venkataraman | H01L 22/00 |
| 2017/0082555 A1* | 3/2017 | He | G01N 21/8851 |
| 2017/0212168 A1* | 7/2017 | Leu | G01R 31/31703 |
| 2018/0196867 A1* | 7/2018 | Wiesmaier | G06F 16/285 |
| 2018/0314984 A1* | 11/2018 | Wiener | G06F 21/554 |
| 2019/0073566 A1* | 3/2019 | Brauer | G06K 9/6262 |
| 2019/0096135 A1* | 3/2019 | Dal Mutto | G06T 7/50 |

\* cited by examiner

| User\ADC | Class A DOI | Class B Key DOI | Class C False | Key DOI GND | DOI GND | False GND | Unknown | Total | Accuracy |
|---|---|---|---|---|---|---|---|---|---|
| Class A DOI | 52 | 4 | 4 | | | | | 60 | 87% |
| Class B Key DOI | 4 | 38 | 2 | | | | | 44 | 86% |
| Class C False | 3 | 6 | 110 | | | | | 119 | 92% |
| Class D Novelty | 11 | 12 | 4 | | | | | 27 | |
| Total | 70 | 60 | 120 | | | | | 250 | |
| Purity | 74% | 64% | 92% | | | | | | |

Figure 4

| User\ADC | Class A DOI | Class B DOI | Class C Key DOI | Class D Key DOI | Class E False | Class F False | Key DOI GND | DOI GND | False GND | Novelty UNK | Total | Extraction |
|---|---|---|---|---|---|---|---|---|---|---|---|---|
| Class A DOI | A1 | A2 | A3 | A4 | A5 | A6 | | | | | | |
| Class B DOI | B1 | B2 | B3 | B4 | B5 | B6 | | | | | | |
| Class C Key DOI | C1 | C2 | C3 | C4 | C5 | C6 | | | | | | |
| Class D Key DOI | D1 | D2 | D3 | D4 | D5 | D6 | | | | | | |
| Class E False | E1 | E2 | E3 | E4 | E5 | E6 | | | | | | |
| Class F False | F1 | F2 | F3 | F4 | F5 | F6 | | | | | | |
| Class g Novelty | | | | | | | | | | | | |
| Class h Novelty | | | | | | | | | | | | |
| Total | | | | | | | | | | | | |
| Purity | | | | | | | | | | | | |

Figure 5a

| User\ADC | Class A DOI | Class B DOI | Class C Key DOI | Class D Key DOI | Class E False | Class F False | Key DOI CND | DOI CND | False CND | Novelty UNK | Total | Extraction |
|---|---|---|---|---|---|---|---|---|---|---|---|---|
| Class A DOI | A1' | A2' | | | A5' | A6' | A7' | | | | | |
| Class B DOI | B1' | B2' | | | B5' | B6' | B7' | | | | | |
| Class C Key DOI | | | C3' | | | | C7' | | | | | |
| Class D Key DOI | | | | D4' | | | D7' | | | | | |
| Class E False | E1' | E2' | | | E5' | E6' | E7' | | | | | |
| Class F False | F1' | F2' | | | F5' | F6' | F7' | | | | | |
| Class g Novelty | | | | | | | | | | | | |
| Class h Novelty | | | | | | | | | | | | |
| Total | | | | | | | | | | | | |
| Purity | | | | | | | | | | | | |

Key DOI CND column with low purity

Minorities in Key-DOI CND counts for extraction

Figure 5b

| User\ADC | Class A DOI | Class B DOI | Class C Key DOI | Class D Key DOI | Class E False | Class F False | Key DOI GND | DOI GND | False GND | Novelty UNK | Total | Extraction |
|---|---|---|---|---|---|---|---|---|---|---|---|---|
| Class A DOI | A1" | A2" | - | - | A5" | A6" | A7 | | | | | |
| Class B DOI | B1" | B2" | - | - | B5" | B6" | B7 | | | | | |
| Class C Key DOI | - | - | C3 | - | - | - | C7 | | | | | |
| Class D Key DOI | - | - | - | D4 | - | - | D7 | | | | | |
| Class E False | E1" | E2" | - | - | E5" | E6" | E7 | | | | | |
| Class F False | F1" | F2" | - | - | F5" | F6" | F7 | | | | | |
| Class g Novelty | | | | | | | | | | | | |
| Class h Novelty | | | | | | | | | | | | |
| Total | | | | | | | | | | | | |
| Purity | | | | | | | | | | | | |

Key DOI in NE UNK not considered extracted

Figure 5c

| User\ADC | Class A DOI | Class B DOI | Class C Key DOI | Class D Key DOI | Class E False | Class F False | Key DOI CND | DOI CND | False CND | Novelty UNK | Total | Extraction |
|---|---|---|---|---|---|---|---|---|---|---|---|---|
| Class A DOI | A1''' | | | | | | A7 | A9 | A10 | | | |
| Class B DOI | | B2''' | | | | | B7 | B9 | B10 | | | |
| Class C Key DOI | | | C3 | | | | C7 | C9 | C10 | | | |
| Class D Key DOI | | | | D4 | | | D7 | D9 | D10 | | | |
| Class E False | | | | | E5''' | E6''' | E7 | E9 | E10 | | | |
| Class F False | | | | | F5''' | F6''' | F7 | F9 | F10 | | | |
| Class g Novelty | | | | | | | G7 | G9 | G10 | | Selective purity | |
| Class h Novelty | | | | | | | H7 | H9 | H10 | | | |
| Total | | | | | | | | | | | | |
| Purity | | | | | | | | | | | | |

Figure 5d

| User\ADC | Class A DOI | Class B Key DOI | Class C False | Key DOI CND | DOI CND | False CND | Unknown | Total | Extraction |
|---|---|---|---|---|---|---|---|---|---|
| Class A DOI | 43 | 2 | 0 | 2 | 4 | 3 | 6 | 60 | 91% |
| Class B Key DOI | 0 | 32 | 0 | 12 | | | | 44 | 100% |
| Class C False | 1 | 2 | 100 | 4 | 10 | 2 | | 119 | 97% |
| Class D Novelty | 2 | 4 | 4 | 8 | | | 9 | 27 | 63% |
| Total | 46 | 40 | 104 | 26 | 14 | 5 | 15 | 250 | |
| Purity | 93% | 80% | 96% | | | | | | |

Figure 6

METHOD OF CLASSIFYING DEFECTS IN A SEMICONDUCTOR SPECIMEN AND SYSTEM THEREOF

TECHNICAL FIELD

The presently disclosed subject matter relates, in general, to the field of examination of a specimen, and more specifically, to methods and systems capable of automated defect classification.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed examination of the devices while they are still in the form of semiconductor specimens.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

The complex manufacturing process of specimens is not error-free and such errors may cause faults in manufactured devices. The faults may include defects that can harm operation of the device, and nuisances, which may be defects, but do not cause any harm or malfunction of the manufactured device. By way of non-limiting examples, defects may be caused during the manufacturing process, due to faults in the raw material, mechanical, electrical or optical errors, human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, defect may be classified into one of a number of classes, such as a particle, a scratch, process, or the like.

Unless specifically stated otherwise, the term "examination" used in this specification should be expansively construed to cover any kind of detection and/or classification of defects in an object. Examination is provided by using non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification, is not limited with respect to the size of the inspected area(s), to the speed or resolution of the scanning, or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different specimen locations or for the same specimen locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least part of the defects detected during the inspection phase are, typically, captured at relatively low speed and/or high-resolution, thereby enabling classification and, optionally, other analyses of the at least part of the defects. In some cases both phases can be implemented by the same inspection tool, and, in some other cases, these two phases are implemented by different inspection tools.

GENERAL DESCRIPTION

In accordance with certain aspect of the presently disclosed subject matter, there is provided a system capable of classifying defects in a specimen into a plurality of classes, the system comprising a processing and memory circuitry (PMC) configured to: obtain data indicative of quality requirements separately defined for each class of the plurality of classes and obtain data indicative of assignment of each class of the plurality of classes to a classification group among three or more classification groups with different priorities. Further the system is configured, during training: to obtain training data comprising a plurality of pre-classified training defects and attribute values thereof; to provide an initial automated classification of the plurality of training defects into the classes of the plurality of classes to yield initially classified training defects; to process the initially classified training defects to obtain an optimal working point corresponding to the highest possible contribution of automated classification while meeting per-class quality requirements defined for each class of the plurality of classes; and to generate classification rule with confidence thresholds corresponding to the optimal working point, wherein the confidence thresholds correspond to prioritized rejection bins, and wherein at least "cannot decide (CND)" rejection bins correspond to the three or more classification group. The system is further configured to apply the generated classification rule when classifying defects in the specimen.

By way of non-limiting example, each class can be assigned to one of the following classification groups: "Key Defects of Interest (KDOI)" being the classification group with the highest priority, "Defects of Interest (DOI)", and "False" being the classification group with the lowest priority. The prioritized rejection bins can consist, accordingly, of "KDOI" CND rejection bin; "DOI" CND rejection bin, "False" CND rejection bin and "unknown (UNK)" rejection bin, and wherein priorities of CND rejection bins correspond to priorities of respective classification groups.

By way of another non-limiting example, each majority class can be assigned to one of the following classification groups: "KDOI", "DOI" and "False", while minority classes can be assigned to "Novelty" classification group, and priority of the groups can configured in the following order: "KDOI">"Novelty">"DOI">"False". Accordingly, the prioritized rejection bins can consist of "KDOI" CND rejection bin; "DOI" CND rejection bin, "False" CND rejection bin and "Novelty" UNK rejection bin, and wherein priorities of all rejection bins correspond to priorities of respective classification groups.

In accordance with another aspect of the presently disclosed subject matter, there is provided a method of automated classifying defects in a specimen into a plurality of classes. The method comprises: obtaining by a processing and memory circuitry (PMC) data indicative of quality requirements separately defined for each class of the plurality of classes and obtaining by the PMC data indicative of assignment of each class of the plurality of classes to a classification group among three or more classification groups with different priorities. The method further comprises, during training: obtaining by the PMC training data comprising a plurality of pre-classified training defects and attribute values thereof; providing by the PMC an initial automated classification of the plurality of training defects into the classes of the plurality of classes to yield initially classified training defects; processing by the PMC the initially classified training defects to obtain an optimal working point corresponding to the highest possible contribution of automated classification while meeting per-class quality requirements defined for each class of the plurality of classes; and generating by the PMC classification rule with confidence thresholds corresponding to the optimal working point, wherein the confidence thresholds correspond to prioritized rejection bins, and wherein at least "cannot decide (CND)" rejection bins correspond to the three or more classification group. The method further comprises applying by the PMC the generated classification rule when classifying defects in the specimen.

In accordance with further aspects and, optionally, in combination with other aspects of the presently disclosed subject matter, processing the initially classified training defects to obtain the optimal working point can comprise: obtaining by the PMC, for each majority class, valid class working points, each valid class working point meeting quality requirements defined for respective class and characterized by confidence thresholds corresponding to the prioritized rejection bins; and processing by the PMC the valid class working points to obtain the optimal working point. Obtaining the valid class working points can comprise distributing at least part of the training defects over the prioritized rejection bins, wherein selecting a rejection bin for a certain defect is provided in accordance with pre-defined rules depending on relative priorities of respective classification groups and priorities of the rejection bins.

In accordance with further aspects and, optionally, in combination with other aspects of the presently disclosed subject matter, several classes assigned to the same classification group can be bound together, and the quality requirements can be defined for the bound classes as for a single class.

In accordance with further aspects and, optionally, in combination with other aspects of the presently disclosed subject matter, the quality requirements defined for a given class can comprise extraction requirement counting both the correctly classified defects of the given class and defects that belong to the given class and have been rejected to one or more prioritized rejection bins selected as counting for extraction of the given class. Optionally, all rejection bins with priorities not lower than priority of classification group of a given class can be selected as counting for the extraction of the given class.

In accordance with further aspects and, optionally, in combination with other aspects of the presently disclosed subject matter, the contribution of automated classification can be calculated differently depending on classification purposes and can be configurable by a user.

Among advantages of certain embodiments of the presently disclosed subject matter is capability of providing automated classification that meets quality requirements separately defined for each of the classes or for bounded classes.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4 schematically illustrates exemplified confusion matrixes configured in accordance with certain embodiments of the presently disclosed subject matter;

FIGS. 5*a*-5*d* schematically illustrate non-limiting examples of a rejection process in accordance with certain embodiments of the presently disclosed subject matter.

FIG. 6 schematically illustrates exemplified confusion matrixes obtained in accordance with certain embodiments of the presently disclosed subject matter.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "calculating", "generating", "assigning", "selecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the classifier and PMC therein disclosed in the present application.

The terms "non-transitory memory" and "non-transitory storage medium" used herein should be expansively construed to cover any volatile or non-volatile computer memory suitable to the presently disclosed subject matter.

The term "defect in a specimen" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
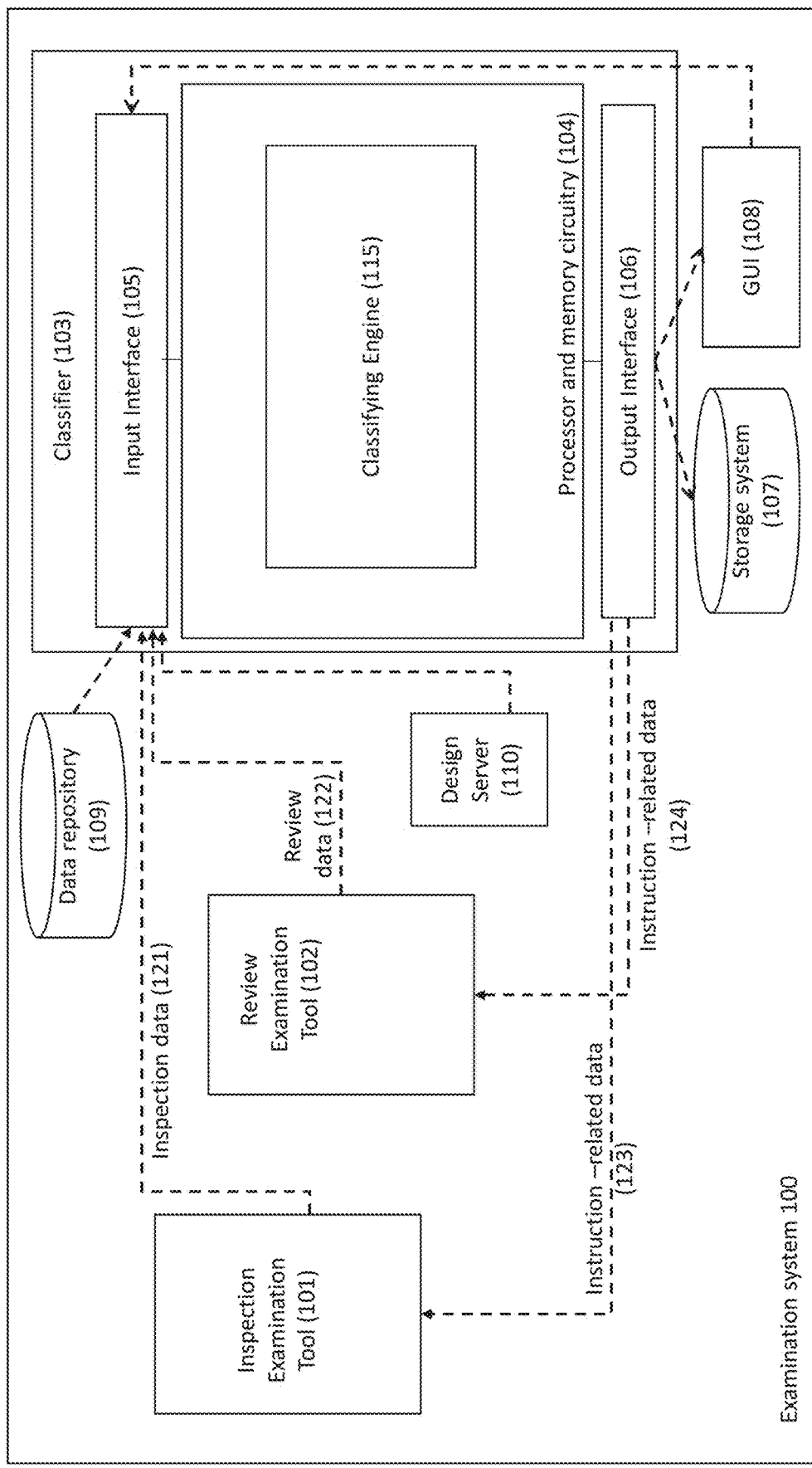
FIG. 1 illustrates a generalized block diagram of an examination system in accordance with certain embodiments of the presently disclosed subject matter.

Bearing this in mind, attention is drawn to FIG. 1 illustrating a generalized block diagram of an examination system in accordance with certain embodiments of the presently disclosed subject matter. The examination system 100 illustrated in FIG. 1 can be used for examination of a specimen (e.g. of a wafer and/or parts thereof) as a part of specimen fabrication. Examination can be part of the object fabrication, and can be carried out during manufacturing the object, or afterwards. The examination system can comprise a variety of examination tools, for example, one or more inspection tools 101 configured to capture inspection images (typically, at relatively high-speed and/or low-resolution), and one or more review tools 102 configured to capture review images of at least part of defects detected by inspection tools 101 (typically, at relatively low-speed and/or high-resolution). The illustrated examination system 100 further comprises a computer-based automated defect classifying tool (referred to hereinafter also as a classifier) 103 capable of automatically classifying defects into a plurality of classes in accordance with a classification rule set (referred to hereinafter as a classification rule) comprising one or more sub-rules. By way of non-limiting example, classification may have different purposes, and the classification results can be used to establish Pareto in order to identify excursions in statistical process control (SPC), filter false defects from true defects, identify specific defects of interest (DoI) and/or otherwise in accordance with classification purposes.

The classifier 103 can be operatively connected to one or more inspection tools 101 and/or one or more review tools 102. Optionally, classifier 103 can be fully or partly integrated with one or more review tools 102. Classifier 103 can be further operatively connected to design server 110 and data repository 109.

A specimen can be examined by inspection tool 101 (e.g. an optical inspection system, low-resolution SEM, etc.). The resulting images and/or derivatives can be processed (optionally together with other data as, for example, design data and/or defect classification data) to select potential defects for review.

A subset of potential defect locations selected for review can be reviewed by review tool 102 (e.g. a scanning electron microscope (SEM) or Atomic Force Microscopy (AFM), etc.) Data (referred to hereinafter as review data 122) informative of review images and/or derivatives thereof and respective associated metadata can be transmitted—directly or via one or more intermediate systems—to classifier 103. It is noted that review data can include data generated by the one or more intermediate systems as derivatives of review images.

Classifier 103 comprises a processor and memory circuitry (PMC) 104 operatively connected to a hardware-based input interface 105 and to a hardware-based output interface 106. PMC 104 is configured to provide processing necessary for operating the classifier as further detailed with reference to FIGS. 2-7, and comprises a processor and a memory (not shown separately within PMC). Operation of classifier 103 and PMC 104 will be further detailed with reference to FIGS. 2-7.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of the examination tools 101 and/or 102, data repositories 109, storage system 107 and/or GUI 108 can be external to the examination system 100 and operate in data communication with classifier 103 via input interface 105 and output interface 106. Classifier 103 can be implemented as a stand-alone computer(s) to be used in conjunction with one or more examination tools. Optionally, the classifier can operate on pre-acquired review data stored in data repositories 109 and/or storage system 107. Alternatively or additionally, the respective functions of the classifier can, at least partly, be integrated with one or more examination tools, process control tools, recipe generation tools, systems for automatic defects review and/or classification, and/or other systems related to examination.

Figure 2:
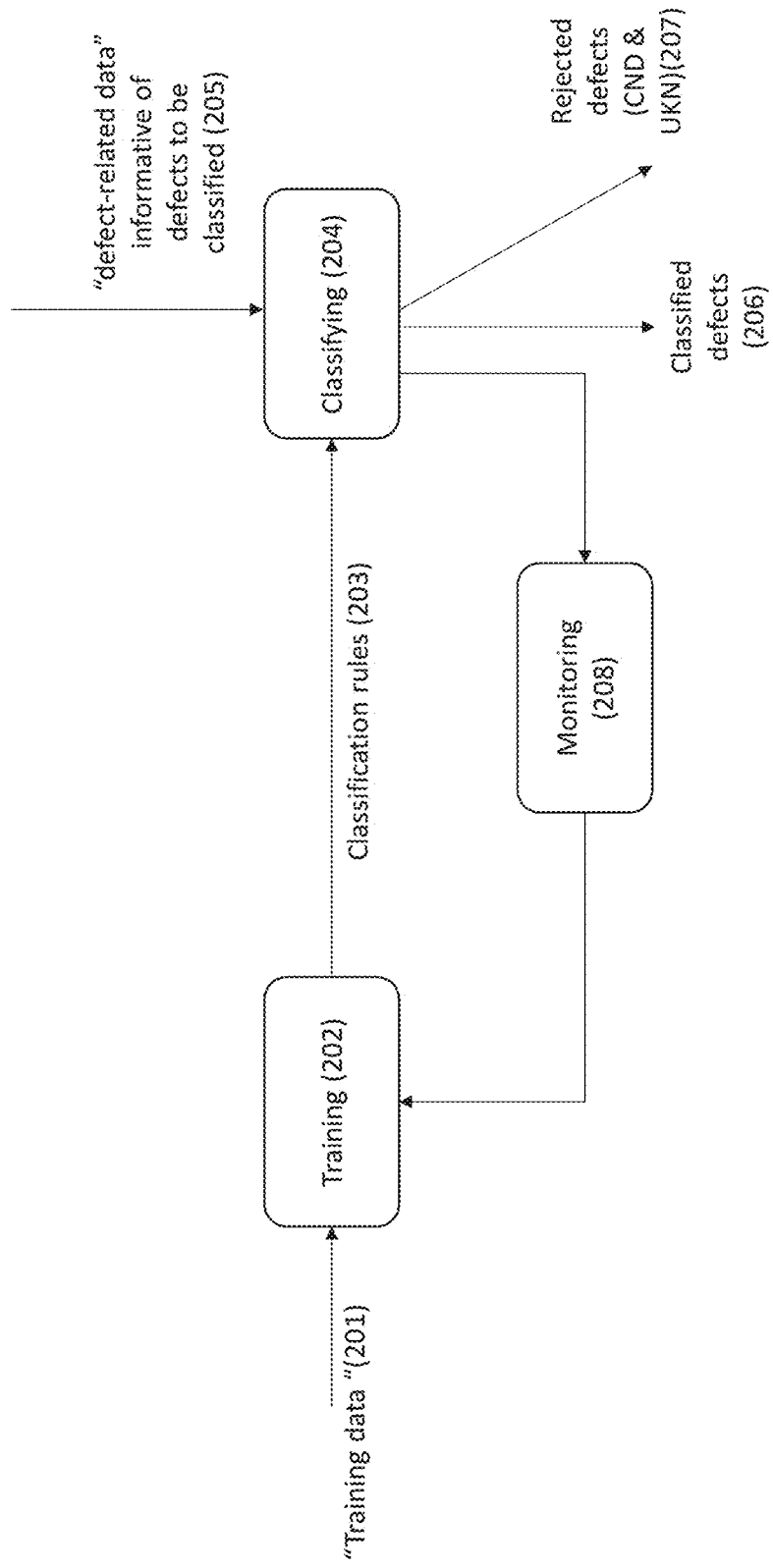
FIG. 2 illustrates a generalized flow-chart of classifying defects in accordance with certain embodiments of the presently disclosed subject matter.

Referring to FIG. 2, there is illustrated a generalized flow-chart of operating an automated defect classifier in accordance with certain embodiments of the presently disclosed subject matter. PMC 104 is configured to execute the respective operations detailed below in accordance with computer-readable instructions implemented on a non-transitory computer-readable storage medium.

As noted above, the classifier 103 is capable of automatically classifying defects into a plurality of classes in accordance with a classification rule. A classification rule comprises a classification engine (e.g. support vector machine (SVM), random forest classification engine, neural networks, etc.) and a plurality of confidence thresholds which can differ for different classes. Classifier 103 is further configured to define, for each given defect, a confidence level indicative of probability that the defect belongs to a certain class, and to assign the given defect to the certain class if the confidence level meets the respective confidence thresholds.

For purpose of illustration only, the following description is provided for a multi-class SVM classifier. Those skilled in the art will readily appreciate that the teachings of the presently disclosed subject matter are, likewise, applicable to any other classifier and or combination of classifiers suitable for classifying defects.

As a matter of illustration, each class can be presented as a volume in the attribute hyperspace, and the threshold confidence levels can be used for drawing the borders of the class volumes (the bounders of a class volume may be larger or smaller and the shape of the borders can be different depending on the threshold confidence level). In accordance with attributes of a given defect, the classification rule determines the volume in the attribute hyperspace (i.e. class) to which the given defect, subject to the confidence threshold, belongs, or rejects the given defect if it does not belong to one of the volumes (classes). When the rejected defect falls in a place in the attribute hyperspace that may be a part of more than one class, the defect can be labeled as "cannot decide (CND)"; and when the rejected defect falls in a place in the attribute hyperspace that is not a part of any class, the defect can be labeled as "unknown (UNK)". By way of non-limiting example, defect attribute values can be representative of shape, texture, material, context, topography and/or other characteristics related to defects.

Prior to operating, the classifier is trained (202) using a set of training data (201) comprising a collection of defects that have been pre-classified into predefined classes (e.g. by a human expert and/or another classifier and/or a previous classifier's version, etc.) and attribute values thereof. When training, the classifier uses the training data in order to set the classification rule (203). The classification rule comprises the plurality of confidence thresholds obtained during training and usable for distinguishing between defects that are identified as belonging to a given class, and those that are not. Thus, the trained classifier 103 is capable to define, subject to confidence thresholds, the class of a given defect as a function of defect attribute values associated with each predetermined defect class in a multi-dimensional attribute space (referred to hereinafter as an attribute hyperspace).

Upon training, the classifier receives (205) defect-related data informative of defects to be classified and applies the classification rule to classify (204) the defects accordingly. It is noted that the term "defect-related data" used herein should be expansively construed to cover values of any attributes required for defect classification. The values of defect attributes can be received by the classifier as a part of review data. Alternatively or additionally, at least part of the defect attribute values can be derived by the classifier from the received review data (optionally, using additional data as, for example, design data) and/or can be received from one or more other sources, including inspection tools.

Subject to required confidence threshold(s), the classifier partitions the attribute hyperspace among predefined defect classes, and yields classified defects (206) by assigning each defect, depending on its location within the attribute hyperspace, to one of the classes. When, upon partitioning, some of defects belong to overlap areas between the classes (i.e. the probability of belonging to certain class is lower than defined by the confidence threshold), the classifier rejects (207) such defects as CND (can-not-decide) defects as the classifier cannot decide which class is to be selected. Likewise, when some of the defects are positioned out of the outer borders of the classes, the classifier rejects such defects as unknown (UNK) defects. Rejected defects or parts thereof can be passed on for classification to a human inspector or any modality that adds new knowledge not available to the previous classifiers.

A given defect can belong to a majority class or a minority class. When applying a classification rule to the set of training data, most of the training defects pre-classified to majority classes will be automatically classified also to majority classes, while most of the training defects pre-classified to minority classes will not be automatically classified as belonging to respective minority classes, and will be rejected or classified to majority classes.

Classification results can be characterized by one or more quality measures (e.g. purity, accuracy, extraction) and performance (e.g. ADC contribution) measures further detailed with reference to FIGS. 3-6. Setting lower confidence requirements could result in the classifier rejecting fewer defects, but may result in more classification errors, or loss of some of the defects of interest. On the other hand, increasing the confidence requirements may enhance the quality of classification, but at the expense of a higher rejection rate or false alarm rate.

Optionally, during operation, the classifier can monitor (208) the performance/quality parameters and, depending on results, can be retrained to refine the classification rule accordingly (e.g. using post-classification results of the incorrectly classified defects).

Non-limiting examples of training and operating classifiers are disclosed in US Patent Application No. US2016/0189055, U.S. Pat. Nos. 8,315,453, 9,607,233 and 9,715,723 assigned to the Assignee of the present application and incorporated herein by reference in their entireties for appropriate teachings of additional or alternative details, features and/or technical background.

As will be further detailed with reference to FIGS. 3-6, in accordance with certain embodiments of the presently disclosed subject matter, classifier 103 is configured to enable assigning each class to a classification group among three or more classification groups with different priorities. All one or more classes assigned to a given classification group have the same priority, this priority corresponds to the priority of the given classification group and differs from priority of all one or more classes assigned to another classification group. Classifier 103 is further configured to enable defining priorities of classification groups. Upon defining the classes for automated classification, a user can assign the classes to respective classification groups with the help of GUI 108. Alternatively, such assignment can be provided by classifier 103 in accordance with predefined rules or received from an external system (e.g. FAB management system) via input interface 105.

Further, classifier 103 is configured to enable the user (and/or management system) to set purity, accuracy and/or extraction requirements separately for each class, and to optimize the classification results in accordance with per-class requirements. As will be further detailed with reference to FIGS. 3-6, classifier 103 can be configured to enable binding together several classes from the same classification group, and setting quality requirements for the bound classes as for a single class.

Figure 3:
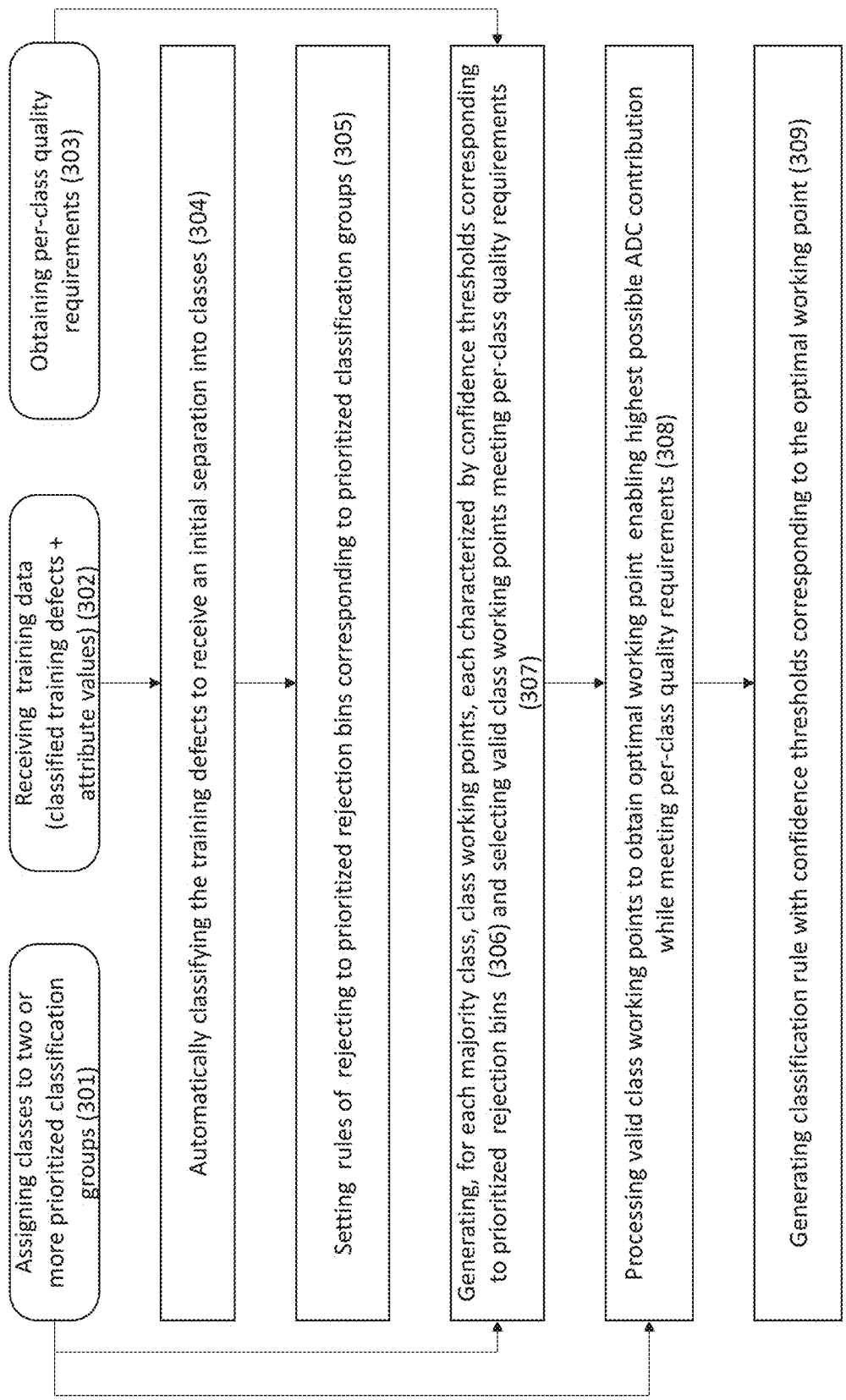
FIG. 3 illustrates a generalized flow-chart of training a classifier in accordance with certain embodiments of the presently disclosed subject matter.

Referring to FIG. 3, there is illustrated a generalized flow-chart of training the automated defect classifier in accordance with certain embodiments of the presently disclosed subject matter. PMC 104 is configured to execute the respective operations detailed below in accordance with computer-readable instructions implemented on a non-transitory computer-readable storage medium.

Prior to training, classifier 103 obtains (301) data indicative of assignment of the classes to three or more prioritized classification groups. Such data can be received as a user's input via GUI 108, generated by classifier 103 in accordance with predefined rules and/or received from an to external system (e.g. FAB management system) via input interface 105. By way of non-limiting example, the classes (both majority and minority) can be assigned to the following classification groups (in order of priority): Key Defects of Interest (KDOI), Defects of Interest (DOI), and False. By way of another non-limiting example, majority classes can be assigned to KDOI, DOI and False classification groups, while minority classes can be assigned to a classification group "Novelty", and priority of the groups can be configured in the following order: KDOI>Novelty>DOI>False.

Further, prior to training, the classifier obtains (303) data indicative of per-class quality requirements. Such data can be received as a user's input via GUI 108 and/or received from an external system (e.g. FAB management system) via input interface 105. Optionally, but not necessary so, the classes assigned to the same group can have similar purpose of classification and, accordingly, similar quality requirements. By way of non-limiting example, classifier 103 can be configured to enable high extraction and/or high purity for the classes in the KDOI group, to enable medium extraction and/or purity for the classes in DOI group and to enable low extraction and/or purity for certain classes in the False group.

Upon receiving (302) training data comprising a collection of pre-classified defects and attribute values thereof, the classifier applies the classification engine to the training defects to receive an initial separation of the training defects into the classes. The initial separation can be provided (although it is not obligatory so) with confidence thresholds set to values enabling separation with no rejections. By way of non-limiting example, the classification engine can be multiclass support vector machine (SVM), random forest classification engine or other suitable classification engine or combination thereof.

An exemplified confusion matrix presenting the results of initial separation is illustrated in FIG. 4. The term "confusion matrix" used in this specification should be expansively construed to cover a table layout allowing visualization of the quality and performance of the classification rule. Columns 401-405 represent the results of automated classification of the training defects by applying the classification rule. Column 406 represents the actual number of defects in each class as was pre-classified (e.g. by a human operator). Row 415 represents the total number of defects classified (correctly or not) by classifier 103 into each of the classes presented by respective columns As illustrated by way of non-limiting example, among majority classes, class A is assigned to group DOI, class B is assigned to group KDOI and class C is assigned to group "False". Further, minority class D is assigned to group "Novelty".

As a result of the initial separation with low thresholds, no defects have been classified by classifier as CND or UNK. As illustrated, among 60 defects pre-classified to class A, 52 defects are correctly classified by classifier 103, while 4 defects of class B are erroneously classified to class A, 3 defects of class C erroneously classified to class A and 11 defects of class D are erroneously classified to class A. Likewise, among 44 defects pre-classified to class B, 38 defects are correctly classified by classifier 103, while 4 defects of class A are erroneously classified to class B, 6 defects of class C and 12 defects of class D; while among 119 defects pre-classified to class C, 110 defects are correctly classified by classifier 103, while 4 defects of class A are erroneously classified to class C, 2 defects of class B erroneously classified to class C and 4 defects of class D are erroneously classified to class C.

Each majority class can be characterized by a quality measure such as purity which is indicative of correctness of the classifier's decisions with regard to the class. Purity can be calculated as a ratio between the number of defects correctly classified to a given class and the total number of defects classified by the classifier to this given class. Thus, in the example illustrated by row 416 in FIG. 4, purity for Class A is 52/70=74.2%; purity for class B is 38/60=63.33% and purity for class C is 110/120=91.66%.

Further, each class can be characterized by such quality measure as accuracy, calculated as a ratio between defects correctly classified to a given class, and defects pre-classified to the given class (illustrated by column 408).

Performance of a classifier can be characterized by a contribution calculated as a ratio of defects which have not been sent for further classification by another modality (e.g. have been classified with satisfying class purity) to the entire number of classified defects.

Purity can be improved by increasing confidence thresholds and thus rejecting some defects as UNK defects or CND defects. However, while a certain confidence threshold improves a specific quality and/or performance measure, it may cause deterioration in a different performance measure as, for example, a contribution.

Referring back to FIG. 3, in accordance with certain embodiments of the presently disclosed subject matter, training further comprises setting (305) rules of rejecting defects to a plurality of three or more prioritized rejection bins corresponding to prioritized classification groups. The priority of rejection bins is configured to correspond to the priority of the classification groups. Classifier 103 selects a rejection bin for a certain defect in accordance with predefined rules which can differ for different bins and depend on priorities of respective classes and priorities of bins.

Following the above non-limiting example of assigning the classes to a prioritized classification group, when each one of majority and minority classes is assigned to one of KDOI, DOI and False classification groups, CND defects can be rejected (in order of priority) into KDOI CND bin, DOI CND bin and False CND bin. Unknown defects can be rejected into one or more UNK bins. Following another non-limiting example, when each one of majority classes is assigned to one of KDOI, DOI and False classification groups, and minority classes are assigned to Novelty group, CND defects can be rejected into KDOI CND bin, DOI CND bin and False CND bin. UNK bin corresponds to Novelty rejections and the priority of rejection bins is configured in correspondence with priority of the classification groups, namely as KDOI CND bin>Novelty UNK bin>DOI CND bin>False CND bin.

ME-OTHERS division can be implemented so that for each bin "OTHERS" comprises only classes of respective bin priority. KDOI defects falsely classified to a given KDOI class are rejected to KDOI rejection bin; DOI defects falsely classified to a given DOI class are rejected to DOI rejection bin, and False defects falsely classified to a given False class are rejected to False rejection bin. CND between key DOI and DOI\false goes to KDOI CND bin (False\DOI defects will not be rejected from KDOI classes). DOI defects classified into False classes will be rejected to DOI CND bin; False defects classified into DOI classes will be rejected to False CND bin; minorities will be rejected to Novelty UNK bin.

Exemplified rejection rules depending on relative priorities of classes and rejection bins are summarized in Table 1 ("Me" refers to defects correctly classified during the initial separation (304)):

TABLE 1

|  | KDOI CND bin | DOI CND bin | False CND bin |
|---|---|---|---|
| KDOI Group of Classes | Me: ME, False, DOI, Minorities. Others: Key-DOI | Me: ME, Key-DOI, False, Minorities. Others: DOI | Me: ME, Key-DOI, DOI, Minorities. Others: False |
| DOI Group of Classes | Me: DOI-A, DOI-B, False, Minorities. Others: Key-DOI | Me: DOI-A, KDOI, False, Minorities. Others: DOI-B | Me: DOI-A, DOI-B, KDOI, Minorities. Others: False |
| False Group of Classes | Me: False-A, False-B, DOI, Minorities. Others: KDOI | Me: FalseA, FalseB, KDOI, Minorities. Others: DOI | No reject, all false classes bound together for selective purity |

Optionally, two or more classes in a classification group can be configured as bound classes, and classifier 103 can be configured to provide no rejections in a case of confusion between the bound classes. Likewise, classifier 103 can be configured to enable quality requirements for the bound classes considered as a single class. It is noted that quality measures calculated for such bound classes are referred to hereinafter as "selected purity" and "selected extraction".

In accordance with certain embodiments of the presently disclosed subject matter, further to purity, the quality requirements can comprise extraction requirements (in addition to or replacing accuracy requirements). The notion of extraction is wider than the notion of accuracy, since extraction counts for each class, both the correctly classified defects of that class, and the defects that belong to that class, and were rejected to a rejection bin that counts for the extraction of that class. Selection of a rejection bin that counts for the extraction of a given class depends on the respective priorities of the classification group of the class and rejection bin where it has been rejected. In accordance with certain embodiments of the presently disclosed subject matter, a rejection bin corresponding to the class priority or higher can always be counted for extraction. It is noted that some reject bins may not be meant for a user's review, and therefore can be counted for contribution (e.g. False CND bin).

Upon setting rejection rules with multiple CND and one or more UNK bins, classifier 103 processes data informative of training defects to generate (306), for each majority class, class working points each characterized by a possible set of confidence thresholds corresponding to the prioritized rejection bins. In the above non-limiting example of KDOI CND bin, Novelty UNK bin, DOI CND bin and False CND bin, each class working point is characterized by four confidence thresholds, each corresponding to a respective bin.

For each given majority class, classifier 103 further selects (307), among class working points generated for the given class, valid working points meeting (at least before optimization) quality requirements received for the given class and counted with considerations of quality requirements for other classes. Thus, classifier 103 yields, for each given majority class, a plurality of valid class working points.

Selection of valid class working points can be provided independently for each class and can include, for a given class:
removing working points that do not meet the purity requirement for the given class;
removing working points that do not provisionally meet the extraction requirement for the given class in consideration of other classes to yield the plurality of working points valid for the class (a working point which provisionally meets extraction requirements at this step, does not necessarily meet the overall classes extraction requirements during further optimization processing);
calculating potential class contribution (i.e. a part of overall contribution provided by the respective class) for each of the valid working points);
sorting valid points according to calculated class contribution, and saving the results for further processing.

It is noted that, optionally, valid class working points can be obtained by straightforward search or any other suitable optimization methods known to those skilled in the art instead of selecting among possible working points.

As further detailed with reference to FIG. 7, classifier 103 processes (308) the plurality of valid class working points, each valid with regard to a respective majority class, to obtain optimal working point enabling highest possible ADC contribution while meeting per-class quality requirements for all classes. When a class working point is characterized by K thresholds corresponding to the rejection bins (e.g. 4 thresholds as in provided non-limiting example), the optimal working point is characterized by (K*number of majority classes) thresholds. It is noted that while the optimized thresholds are calculated for majority classes only, optimization processing (308) can be provided with consideration of the extraction requirement of minority classes.

It is noted, that in accordance with certain embodiments of the presently disclosed subject matter, the contribution of classifier 103 (i.e. the optimization objective) can be calculated differently depending on classification purposes and/or the classifier's configuration. The classifier can be configured to enable a user to define (e.g. via GUI 108) contributing columns in a confusion matrix. By way of non-limiting example, when classification results are to be used for statistical process control (SPC), columns counted for contribution can include all classes that have been classified with satisfying class purity and False CND bin. By way of another non-limiting example, when classification results are to be used for DOI hunting, columns counted for contribution can include all classes that have been classified with satisfying class purity, DOI CND bin and False CND bin. In general, contribution can be calculated as a number of defects in the columns defined as counted for contribution divided by the total number of the classified defects. Optionally, contribution can be defined as a filter rate, false filter rate or any other measure of performance.

Upon obtaining the optimal working point, the classifier generates (309) a classification rule comprising classification engine used for the initial separation and a plurality of confidence thresholds for each rejection bin and majority class, the confidence thresholds corresponding to the optimal working point. The thresholds in the classification rule can be further adjusted in accordance with the user's requirements (e.g. in order to enhance performance by reducing quality requirements). It is noted that in some cases applying the generated classification rule to defects to be classified can result in collision between rejection bins (i.e., subject to confidence thresholds, a given defect can be rejected to several bins). For such a case, the classifier 103 can be configured to reject the defect to a bin with the highest priority between possible bins.

It is noted that the teachings of the presently disclosed subject matter are not bound by the classification groups and prioritized rejection bins as illustrated in the non-limiting examples, and are, likewise, applicable to other types, numbers and/or priorities of classification groups and corresponding rejection bin.

Referring to FIGS. 5a-5d, there are schematically illustrated non-limiting examples of the rejection process in accordance with certain embodiments of the presently disclosed subject matter. FIG. 5a illustrates a confusion matrix obtained after initial separation. FIG. 5b illustrates a confusion matrix after classifier 103 has rejected defects so as to meet per-class purity/extraction requirements defined for KDOI classes. FIG. 5c illustrates a confusion matrix after classifier 103 has further rejected defects so as to meet novelty extraction requirements. FIG. 5d illustrates a confusion matrix after classifier 103 has further rejected defects so as to meet per-class requirements defined for classes in DOI and False classification groups. It is noted that in the illustrated example, class E is bound with class F, and purity and extraction are calculated as a selected purity and selected extraction in accordance with defects correctly classified to any of these classes. Upon all illustrated rejections, distribution of defects corresponds to all per/class quality requirements, and respective confidence thresholds correspond to valid class working points. It is noted that illustrated obtaining per-class working points can be provided in parallel to two or more classes.

FIG. 6 illustrates an exemplified confusion matrix presenting the results of optimized distribution of defects illustrated in FIG. 4. As illustrated, KDOI class meets exemplified predefined purity requirement of 80% and exemplified predefined extraction requirement of 100%, DOI class meets exemplified predefined purity requirement of 93% and exemplified predefined extraction requirement of 91%; novelty extraction meets exemplified predefined requirement of 63%. It is noted that in the illustrated example, defects with confusion with or within KDOI classes have been rejected to KDOI CND bin; defects with confusion within DOI classes and DOI defects classified as False have been rejected to DOI CND bin, while defects with confusion between DOI and False classes have been rejected to False CND bin and with confusion between DOI classes, and Minority classes have been rejected to Novelty UNK bin.

In the illustrated example, purity and extraction for Class B (assigned to KDOI classification group) can be calculated as follows:

Class $B$ purity=32 (# of defects correctly automatically classified to Class $B$)/40 (total # of defects automatically classified to Class $B$)=80%.

Class $B$ extraction=32 (# of Class $B$ defects above purity threshold)+12 (# of defects in Class $B$ KDOI CND bin))/44 (# of defects manually classified to Class $B$)=100%.

In the illustrated example, purity and extraction for Class A (assigned to DOI classification group) can be calculated as follows:

Class $A$ purity=43 (# of defects correctly automatically classified to Class $A$)/43 (total # of defects automatically classified to Class $A$)=93%.

Class $A$ extraction=(43 (# of Class $A$ defects above purity threshold)+2+4+6 (# of defects in Class $A$ KDOI CND bin+DOI CND bin+Unknown CND bin)/60 (# of defects manually classified to Class $B$)=91%.

As noted above, contribution calculation depends on the classification purposes and/or user's requirements. By way of non-limiting example, the user may be interested to manually review all KDOI defects regardless of automated classification results. In such a case, the contributing columns are columns 401, 402, 405-2 and 405-3, and the contribution is equal to (46+104+14+5)/250=67%. By way of another non-limiting example, contributing columns can be defined by the user as KDOI and DOI classes above the purity threshold, False classes above the selective purity threshold, DOI CND bin (unless required to be reviewed), False CND bin and UNK bin. In the illustrated example, such definition corresponds to columns 401, 402, 403, 405-2, 405-3 and 404-1, and the contribution is equal to (46+40+104+14+5+15)/250=90%.

Figure 7:
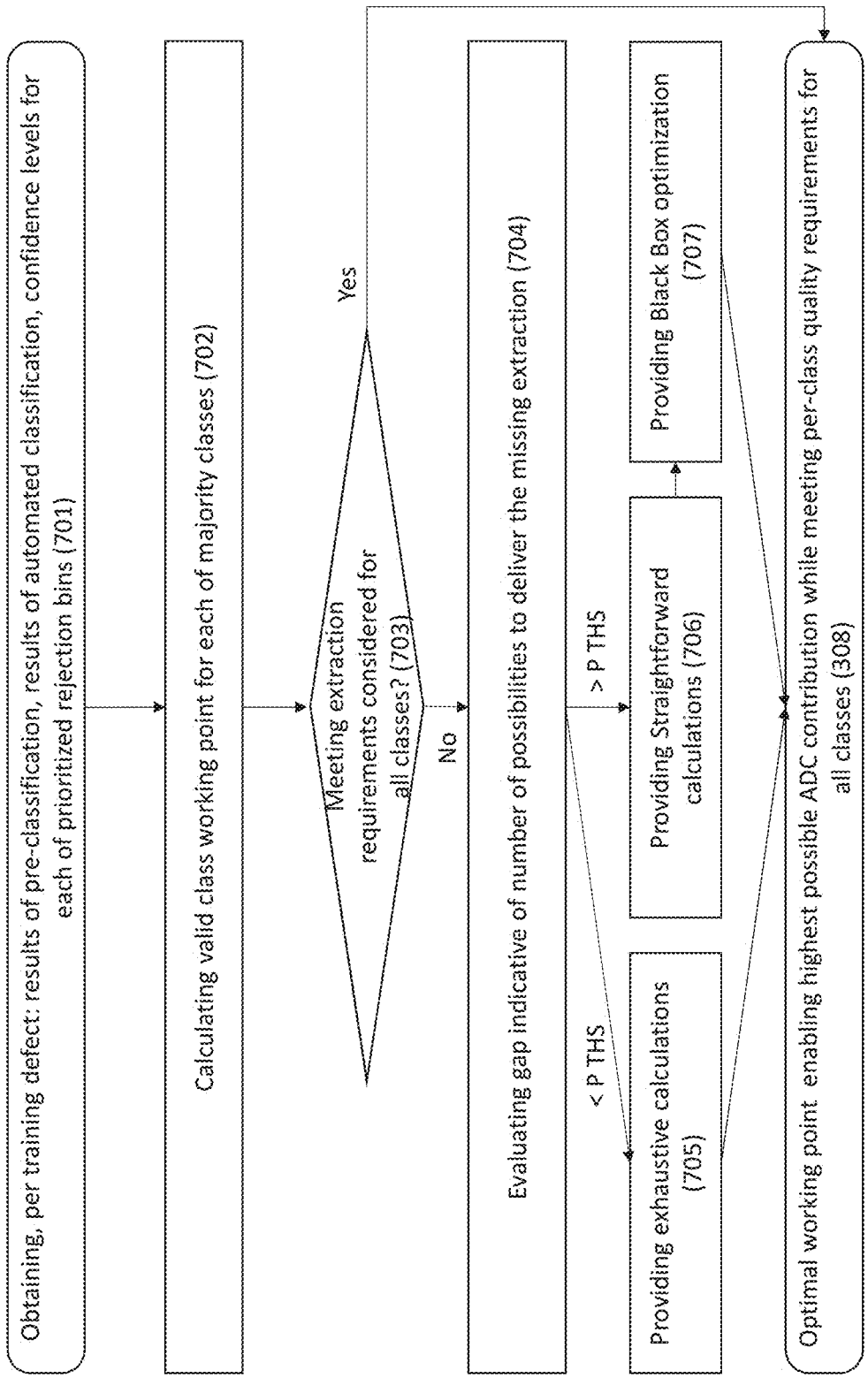
FIG. 7 illustrates a generalized flow-chart of processing working points to obtain optimal working point enabling highest possible ADC contribution while meeting per-class quality requirements.

Referring to FIG. 7, there is illustrated a generalized flow-chart of exemplified processing (308) working points in accordance with certain embodiments of the presently disclosed subject matter.

Upon obtaining (701), per training defect: results of pre-classification, results of automated classification and confidence levels with regard to each of prioritized rejection bins, classifier 103 calculates (702) valid class working points for each of the majority classes.

Among valid class working points, classifier 103 selects a valid working point with maximal class contribution and checks (703) whether this working point meets the extraction requirements in consideration of all classes. If it does, then this point is the point of global maximum enabling highest possible ADC contribution while meeting per-class quality requirements.

If the working point does not meet the extraction requirements in consideration of all classes, classifier 103 evaluates (704) the gap indicative of the number of valid class working points capable of delivering the missing extraction. If the gap is lower than a performance threshold (PTHS), classifier 103 provides (705) an exhaustive calculation going through all combinations of valid class working points to find the one with the best contribution. Such a working point corresponds to the optimal working point enabling highest possible ADC contribution while meeting per-class quality requirements for all classes. If the gap exceeds the performance threshold, classifier 103 provides calculations using (706) a straightforward (greedy) algorithm optionally followed by a black box optimization (e.g. Particle Swam Optimization). It is noted that the performance threshold depends on a processing power of PMC 104.

By way of non-limiting example, the straightforward calculations can be provided as follows:

Upon obtaining for each majority class valid class working points, partial extraction and respective class contribution, classifier 103 provides, in the order of respective priorities, optimization for each classification group. For each majority class in a given classification group, classifier 103 calculates effectiveness defined as a ratio of extraction gain to contribution lost, greedily chooses the best majority class for defect extraction within the given classification group, and repeats until extraction requirements are satisfied in consideration of all classes in the given group. Upon finishing such cycles for each classification group, classifier 103 obtains, greedily optimized working point.

Those skilled in the art will readily appreciate that the teachings of the presently disclosed subject matter are not bound by the processing illustrated in FIG. 7. Other appropriate algorithms and combinations thereof can be implemented in order to obtain optimal working point enabling highest possible ADC contribution while meeting per-class quality requirements.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A system capable of classifying defects in a specimen into a plurality of classes, the system comprising a processing and memory circuitry (PMC) configured to:
obtain data indicative of quality requirements separately defined for each class of the plurality of classes;
obtain data indicative of assignment of each class of the plurality of classes to a classification group among at least three classification groups with different priorities for automated classification;
specify at least three CANNOT DECIDE (CND) rejection bins configured for collecting CND-based rejected defects that cannot be classified to any class of the plurality of classes with a confidence level corresponding to a respective class, wherein the at least three CND rejection bins correspond to the at least three classification groups, and classification priorities of the at least three CND rejection bins correspond to the priorities of respective classification groups and wherein a classification priority of a given CND rejection bin corresponds to a priority of selecting the given CND rejection bin for a CND-based rejected defect;
during training:
obtain training data comprising a plurality of pre-classified training defects and attribute values thereof;
provide an initial automated classification of the plurality of pre-classified training defects into classes of the plurality of classes to yield initially classified training defects;
process the initially classified training defects to obtain an optimal working point corresponding to a highest possible contribution of automated classification while meeting per-class quality requirements defined for each class of the plurality of classes;
generate classification rule with confidence thresholds corresponding to an optimal working point, wherein the confidence thresholds correspond to rejection bins with different classification priorities, and wherein the rejection bins comprise the at least three CND rejection bins; and
apply the generated classification rule when classifying defects in the specimen.

2. The system of claim 1, wherein the PMC is further configured to enable binding together several classes assigned to a same classification group, and to define quality requirements for bound classes as for a single class.

3. The system of claim 1, wherein each class is assigned to one of the following classification groups: KEY DEFECTS OF INTEREST (KDOI) being the classification group with a highest priority, DEFECTS OF INTEREST (DOI), and FALSE being the classification group with a lowest priority.

4. The system of claim 3, wherein the CND rejection bins consist of KDOI CND rejection bin, DOI CND rejection bin, FALSE CND rejection bin, and UNKNOWN (UNK) rejection bin.

5. The system of claim 1, wherein each majority class is assigned to one of the following classification groups: KDOI, DOI and False, minority classes are assigned to NOVELTY classification group, and priority of the groups is configured in the following order: KDOI>NOVELTY>DOI>FALSE.

6. The system of claim 5, wherein the CND rejection bins consist of KDOI CND rejection bin, DOI CND rejection bin, FALSE CND rejection bin and NOVELTY UNK rejection bin.

7. The system of claim 1, wherein the quality requirements defined for a given class comprise extraction requirement counting both correctly classified defects of the given class and defects that belong to the given class and have been rejected to one or more rejection bins selected as counting for extraction of the given class.

8. The system of claim 1, wherein the contribution of automated classification is calculated differently depending on classification purposes.

9. A method of automated classifying defects in a specimen into a plurality of classes, the method comprising:
obtaining by a processing and memory circuitry (PMC) data indicative of quality requirements separately defined for each class of the plurality of classes;
obtaining, by the PMC, data indicative of assignment of each class of the plurality of classes to a classification group among at least three classification groups with different priorities for automated classification;
specify at least three CANNOT DECIDE (CND) rejection bins configured for collecting CND-based rejected defects that cannot be classified to any class of the plurality of classes with a confidence level corresponding to a respective class, wherein the at least three CND rejection bins correspond to the at least three classification groups, and classification priorities of the at least three CND rejection bins correspond to the priorities of respective classification groups and wherein a classification priority of a given CND rejection bin corresponds to a priority of selecting the given CND rejection bin for a CND-based rejected defect;
during training:
obtaining, by the PMC, training data comprising a plurality of pre-classified training defects and attribute values thereof;

providing, by the PMC, an initial automated classification of the plurality of pre-classified training defects into classes of the plurality of classes to yield initially classified training defects;

processing, by the PMC, the initially classified training defects to obtain an optimal working point corresponding to a highest possible contribution of automated classification while meeting per-class quality requirements defined for each class of the plurality of classes;

generating, by the PMC, classification rule with confidence thresholds corresponding to an optimal working point, wherein the confidence thresholds correspond to rejection bins with different classification priorities, and wherein the rejection bins comprise the least three CND rejection bins; and applying by the PMC the generated classification rule when classifying defects in the specimen.

10. The method of claim 9, further comprising binding together several classes assigned to a same classification group, and defining quality requirements for bound classes as for a single class.

11. The method of claim 9, wherein each class is assigned to one of the following classification groups: KEY DEFECTS OF INTEREST (KDOI) being the classification group with a highest priority, DEFECTS OF INTEREST (DOI), and FALSE being the classification group with a lowest priority.

12. The method of claim 11, wherein the CND rejection bins consist of KDOI CND rejection bin, DOI CND rejection bin, FALSE CND rejection bin, and UNKNOWN (UNK) rejection bin.

13. The method of claim 9, wherein each majority class is assigned to one of the following classification groups: KDOI, DOI and FALSE, minority classes are assigned to NOVELTY classification group, and priority of the groups is configured in the following order: KDOI>NOVELTY>DOI>FALSE.

14. The method of claim 13, wherein the CND rejection bins consist of KDOI CND rejection bin, DOI CND rejection bin, FALSE CND rejection bin, and NOVELTY UNK rejection bin.

15. The method of claim 9, wherein processing the initially classified training defects to obtain the optimal working point comprises: obtaining by the PMC, for each majority class, valid class working points, each valid class working point meeting quality requirements defined for respective class and characterized by confidence thresholds corresponding to the CND rejection bins;

processing by the PMC the valid class working points to obtain the optimal working point.

16. The method of claim 15, wherein obtaining the valid class working points comprises distributing at least part of the training defects over the CND rejection bins, and wherein selecting a rejection bin for a certain defect is provided in accordance with predefined rules depending on relative priorities of respective classification groups and priorities of the rejection bins.

17. The method of claim 9, wherein the quality requirements defined for a given class comprise extraction requirement counting both correctly classified defects of the given class and defects that belong to the given class and have been rejected to one or more rejection bins selected as counting for extraction of the given class.

18. The method of claim 9, wherein all rejection bins with priorities not lower than priority of classification group of a given class are selected as counting for the extraction of the given class.

19. The method of claim 9, wherein the contribution of automated classification is calculated differently depending on classification purposes.

20. A non-transitory computer readable medium comprising instructions that, when executed by a computer, cause the computer to perform a method of automated classifying defects in a specimen into a plurality of classes, the method comprising:

obtaining data indicative of quality requirements separately defined for each class of the plurality of classes;

obtaining data indicative of assignment of each class of the plurality of classes to a classification group among at least three classification groups with different priorities for automated classification;

specify at least three CANNOT DECIDE (CND) rejection bins configured for collecting CND-based rejected defects that cannot be classified to any class of the plurality of classes with a confidence level corresponding to a respective class, wherein the at least three CND rejection bins correspond to the at least three classification groups, and classification priorities of CND rejection bins correspond to the priorities of respective classification groups and wherein a classification priority of a given CND rejection bin corresponds to a priority of selecting the given CND rejection bin for a CND-based rejected defect;

during training:
obtaining training data comprising a plurality of pre-classified training defects and attribute values thereof, providing an initial automated classification of the plurality of pre-classified training defects into classes of the plurality of classes to yield initially classified training defects;

processing the initially classified training defects to obtain an optimal working point corresponding to a highest possible contribution of automated classification while meeting per-class quality requirements defined for each class of the plurality of classes;

generating classification rule with confidence thresholds corresponding to an optimal working point, wherein the confidence thresholds correspond to rejection bins with different classification priorities, and wherein the rejection bins comprise the at least three CND rejection bins; and applying the generated classification rule when classifying defects in the specimen.

* * * * *